United States Patent [19]

Morrison et al.

[11] Patent Number: 5,690,449
[45] Date of Patent: Nov. 25, 1997

[54] TOOL BASE SECURING SYSTEM

[75] Inventors: Ward D. Morrison; Perry L. Coombs, both of Claremont, N.H.

[73] Assignee: Cannon Industries, Inc., Claremont, N.H.

[21] Appl. No.: 582,867

[22] Filed: Jan. 4, 1996

[51] Int. Cl.⁶ ........................................................ E02D 5/74
[52] U.S. Cl. ........................................ 405/303; 405/259.1
[58] Field of Search ............................. 405/303, 259.1, 405/259.5, 259.6; 29/809, 811, 813

[56] References Cited

U.S. PATENT DOCUMENTS

| | | | |
|---|---|---|---|
| 4,158,520 | 6/1979 | Prebensen | 405/260 |
| 4,226,559 | 10/1980 | Prebensen | 405/303 |
| 4,473,325 | 9/1984 | Beney et al. | 405/303 |
| 4,832,536 | 5/1989 | Spross et al. | 405/303 |
| 5,114,279 | 5/1992 | Bjerngren et al. | 405/303 |
| 5,556,235 | 9/1996 | Morrison et al. | 405/303 |

*Primary Examiner*—Tamara L. Graysay
*Assistant Examiner*—Tara L. Mayo
*Attorney, Agent, or Firm*—Michael J. Weins

[57] ABSTRACT

A tool base securing system for a rock bolter. One aspect of the invention provides a securing system for the tool base which is being advanced on a cradle along a feed shell. This system includes a forward latch which is pivotably attached to the forward section of the cradle base and has a tool base engaging lug. A mechanical linkage is provided to engage and disengage the front lug from the tool base as the cradle is advanced from and returned to a park position on the feed shell. In a preferred embodiment a rear latch is also provided which has a mechanical linkage for engaging and disengaging a rear lug. A second aspect of the invention provides a securing system which provides a mechanical interlock which immobilizes all tool bases which are off the cradle when the cradle is being advanced.

20 Claims, 8 Drawing Sheets

Figure 1

*Prior Art*

TOOL BASE SECURING SYSTEM

FIELD OF THE INVENTION

The present invention relates to a rock bolter and more particularly to an interlock system for maintaining tool bases secure during the bolting operations.

BACKGROUND OF THE INVENTION

Rock bolt installing machines require the use of multiple tools to install a bolt. The number of tools will depend on the type of bolt to be set. For example, when split set bolts are employed, installation of the bolt requires a drill for drilling a hole in the rock and a bolt driver for placing the bolt into the rock. For other bolts such as resin set bolts, a third tool is needed to insert resin sausages into the bolt holes. These tools, when positioned on a cradle, are advanced with the cradle on a feed shell toward the rock surface, where each of the tools performs its respective operation in the bolt installation process. When the tools are slid onto and off of a single cradle before the cradle is advanced on the feed shell, locks are provided to prevent the tools from sliding off the cradle while being advanced on the feed shell. These locks can be electrical, hydraulic, mechanical, or a combination thereof. Mechanical locks are preferred since the they are less subject to failure in a mine environment than the more complex electro-mechanical locks.

Mechanical locks such as taught in U.S. Pat. No. 5,114,279 use a lug to engage a hole in the central portion of the tool base which is located on the cradle. The lug is activated by a spring. While this offers a simple solution to the locking problem it suffers from two shortcomings. First, if the spring force is not sufficient, the lug may fail to engage the base to secure it and second, the operator can advance the cradle even if the lug has failed to engage the cradle. Furthermore, systems such as the system of the '279 patent frequently do not provide a securing system for the off-cradle tool bases to protect against operator error if the operator attempts to position a tool on the cradle when the cradle is not in a position to accept the tool.

Thus there is a need for a tool base securing system which will secure the on-cradle tool base to the cradle as the cradle is advanced along the feed shell and there is also a need for a securing system which will secure the off-cradle tool bases against accidental movement by the operator.

SUMMARY OF THE INVENTION

The present invention provides a tool base securing system for a rock bolter. Typically rock bolters, for which the present invention is intended to be used, have a transfer platform which has tool base transfer tracks for engaging tool bases on which rock bolt setting tools are mounted. In such systems, a transfer slider is provided for positioning the tool bases. The transfer slider provides the motivating force to advance the tool bases along the tool base transfer tracks and onto a cradle having a front section and a rear section. The cradle also has tool base embracing tracks for accepting tool bases from the transfer tracks of the transfer platform.

The cradle in turn is typically slidably engaged with a feed shell and has a park position on the feed shell where the tool base embracing tracks are aligned with the tool base transfer tracks of the transfer platform. When the cradle is so positioned the tool base embracing tracks of the cradle will accept tool bases moved along the tool base transfer tracks by the transfer slider. Once a selected tool base and its associated tool have been positioned onto the cradle it becomes an on-cradle, tool base, at which time the on-cradle tool base and its associated on-cradle tool can be advanced along the feed shell to a forward region of the feed shell, while the remaining tool bases, the off-cradle tool bases, remain on the transfer platform. The advancement of the on-cradle tool base to the forward region of the feed shell allows the tool disposed on the on-cradle tool base to be transported from the park position to the forward region where the tool can be brought into close proximity with the rock surface into which a bolt is to be installed.

One aspect of the tool base securing system of the present invention provides a mechanical linkage which assures that the on-cradle tool base remains locked with respect to the cradle as the cradle is advanced along the feed shell and prevents the cradle from advancing until such time as the on-cradle tool base is locked with respect to the cradle. Similarly, the on-cradle tool base securing system unlocks the on-cradle tool base with respect to the cradle as the cradle is parked and assures that the tool base is unlocked before the cradle can be parked.

The on-cradle tool base securing system of the present invention has in an elementary form a front latch pivotably mounted on the front section of the cradle. The front latch has a front tool base engaging lug which is configured to engage the on-cradle tool base. Means for engaging the front tool base engaging lug with the on-cradle tool base as the cradle advances from the park position are provided. The means for engaging the front tool base engaging lug are mechanical and designed to prevent advancement of the cradle unless the front tool base engaging lug is engaged.

Means for disengaging the front tool base engaging lug from the on-cradle tool base as the cradle returns to the park position are also provided. The means for disengaging the front tool base engaging lug are mechanical and designed to prevent parking of the cradle until the front tool base engaging lug is disengaged.

It is preferred that the means for engaging the front tool base engaging lug be provided by a front lug lifter which is fixed with respect to the transfer platform and a front lug raising surface which forms part of the front latch. The front lug raising surface is contoured such that the front lug raising surface will engage the front lug lifter and bring the front tool base engaging lug into engagement with the on-cradle tool base as the cradle advances from the park position towards the forward region of the feed shell.

It is also preferred that the means for disengaging the front tool base engaging lug be provided by a front lug depressor which is fixed with respect to the transfer platform and a front lug lowering surface which forms part of the front latch. The front lug lowering surface is contoured such that as the cradle is returned to the park position, the front lug lowering surface will engage the front lug depressor and remove the front tool base engaging lug from engagement with the on-cradle tool base.

Means for maintaining the front tool base engaging lug engaged with the on-cradle tool base when the cradle is displaced from the park position are provided. These means are provided to avoid disengagement of the front tool base engaging lug as the on-cradle tool base is transported along the feed shell.

To further stabilize the on-cradle tool base when the cradle is being advanced along the feed shell, the tool base securing system preferably also has a rear latch pivotably mounted on the rear section of the cradle. The rear latch has a rear tool base engaging lug which is also designed to engage the on-cradle tool base. Means for engaging the rear tool base engaging lug with the on-cradle tool base as the cradle advances from the park position are provided. The means for engaging the rear tool base engaging lug are mechanical and designed to prevent advancement of the cradle unless the rear tool base engaging lug is engaged.

When a rear latch is employed, means for disengaging the rear tool base engaging lug from the on-cradle tool base as the cradle returns to the parked position are also provided. The means for disengaging the rear tool base engaging lug are mechanical and designed to prevent parking of the cradle until the rear tool base engaging lug is disengaged.

It is preferred that the means for engaging the rear tool base engaging lug be provided by a rear lug lifter which is fixed with respect to the transfer platform and a rear lug raising surface which forms part of the rear latch. The rear lug raising surface is contoured such that the rear lug raising surface will engage the rear lug lifter and bring the rear tool base engaging lug into engagement with the on-cradle tool base as the cradle moves from the park position towards the forward region of the feed shell.

It also is further preferred that the means for disengaging the rear tool base engaging lug be provided by a rear lug depressor which is fixed with respect to the transfer platform and a rear lug lowering surface which forms part of the rear latch. The rear lug lowering surface is contoured such that as the cradle returns to the park position, the rear lug lowering surface will engage the rear lug depressor and remove the rear tool base engaging lug from engagement with the on-cradle tool base.

When a rear latch is employed, means for maintaining the rear tool base engaging lug engaged with the on-cradle tool base when the cradle is displaced from the park position are provided. These means are provided to avoid disengagement of the rear tool base engaging lug as the on-cradle tool base is transported along the feed shell.

It is further preferred that the means for maintaining the front tool base engaging lug and the rear tool base engaging lug engaged with the on-cradle tool base be biasing means such as springs and preferably coil springs.

For rock bolters with transfer platforms such as described above it is also preferred that the tool base securing system be provided with means for immobilizing the off-cradle tool bases when the cradle is advanced from the park position. This feature, while well suited for use with transfer systems employing the tool base securing system described above, has independent utility for other rock bolter transfer systems. Such means serve to prevent inadvertent movement of the off-cradle tool bases due to operator error when the cradle is not in the park position.

It is preferred that the means for immobilizing the off-cradle tool bases be mechanical. An elementary off-cradle tool base immobilization system of the present invention has a locking plunger and a locking plunger support which is fixably positioned with respect to the feed shell. In one preferred embodiment the locking plunger support is provided by a locking plunger passage in a transfer base member which is fixably positioned with respect to the feed shell. An indexing plate is connected to the transfer slider. The indexing plate has plunger passages therein, each of the plunger passages being configured to accept the locking plunger. The plunger passages are positioned with respect to the tool bases such that, when a selected tool base is placed on the cradle, providing an on-cradle tool base, a corresponding plunger passage will align with the locking plunger. Means for biasing the locking plunger such that the locking plunger will be advanced toward the indexing plate and engage the corresponding plunger passage when the cradle is withdrawn from the park position are provided. Means for disengaging the locking plunger from the corresponding plunger passage when the cradle enters the park position are also provided.

Preferred means for biasing the locking plunger include a plunger chamber attached to the transfer base member and positioned such that the locking plunger is engaged in part therein. A plunger spring is housed in the plunger chamber and engages the locking plunger, biasing the locking plunger toward the indexing plate.

One means for disengaging the locking plunger is to provide a stop connected to the plunger which engages the cradle. One preferred form of stop is to provide a stop rod having a stop rod axis. The stop rod passes through a stop rod passage in the transfer base member. The stop rod passage is positioned such that, when the stop rod passes through the stop rod passage, the stop rod axis will intersect the cradle. With the stop rod so positioned there are alternative ways in which the locking plunger can be disengaged. This can be accomplished by having the cradle brought into contact with the stop rod or, alternatively, by having the stop rod attached to the cradle.

Treating first the case where the stop rod engages the cradle, one preferred embodiment employs a tie bar fixably attached to the stop rod and to the locking plunger as the means to disengage the locking plunger from the corresponding plunger passage.

Another preferred means employs a pivot arm pivotably connected to the transfer base member, to the stop rod, and to the locking plunger, where the pivotable connection of the stop rod is between the connection with the transfer base member and the locking plunger. The pivot arm provides mechanical advantage allowing the translation of the locking plunger to be greater than the translation of the stop rod.

When a pivot arm is employed to connect the stop rod and the locking plunger, means are provided to vary the separation between the pivotable axes of the transfer base member connection and the locking plunger connection. One simple means is to connect the pivot arm with at least one pin and slot coupling.

In the second case, when the stop rod is affixed to the cradle, again either a tie bar or a pivot arm can be employed to disengage the locking plunger from the corresponding plunger passage. When a tie bar is used, the stop rod will be brought into contact with the tie bar which is fixably attached to the plunger and positioned to engage the stop rod as the stop rod is advanced through the stop rod passage.

Similarly, when a pivot arm is employed, the pivot arm is positioned so as to engage the stop rod as the stop rod is advanced through the stop rod passage.

In this latter case, rather than employing a stop rod, the cradle itself can be used to engage the pivot arm.

BRIEF DESCRIPTION OF THE FIGURES

FIG. 1 is an isometric view illustrating principal elements of a typical prior art tool selection and transport assembly for a rock bolter. The tool selection and transport assembly has a transfer platform having tool base transfer tracks thereon. Bolt setting tools are mounted on tool bases which are designed to slidably engage the tool base transfer tracks. A cradle is provided which slidably engages a feed shell which transports the cradle and a tool positioned on the cradle from a park position to a forward region of the feed shell. In the park position, the cradle is aligned to accept tool bases from the tool base transfer tracks. After accepting a tool base, the cradle can be advanced to a forward region of the feed shell where the on-cradle tool is employed to perform a step in the bolt setting process. A transfer slider is provided which transports the tool bases riding on the tool base transfer tracks and directs the bolt setting tools along the tool base transfer tracks allowing the selection of a particular tool to be mounted on the cradle.

BEST MODE OF CARRYING THE INVENTION INTO PRACTICE

Figure 1:
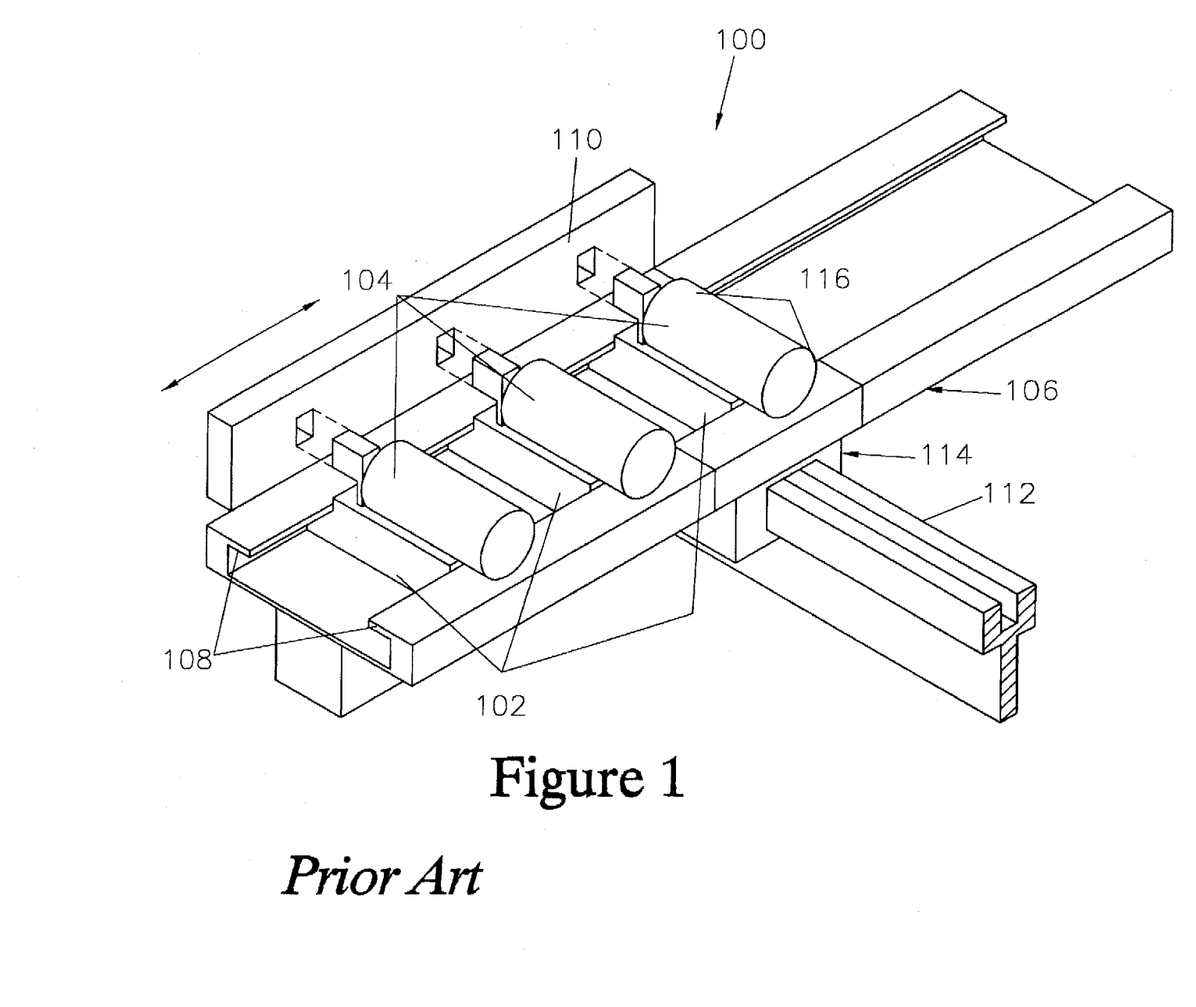

FIG. 1 is an isometric view illustrating many of the major elements of a prior art rock drilling tool selection and transport assembly 100 for a rock bolter such as would be suitable for the rock bolter described in U.S. patent application Ser. No. 08/390,746, now U.S. Pat. No. 5,556,235, assigned to the assignee of the present application. The rock drilling tool transport assembly 100 has tool bases 102 to which bolt setting tools 104 are mounted. A transfer platform 106 is provided which has tool base transfer tracks 108 into which the tool bases 102 slidably engage. Movably connected with respect to the transfer platform 106 is a transfer slider 110 which engages the tool bases 102 and serves to position them along the tool base transfer tracks 108. A feed shell 112 is fixably positioned with respect to the transfer platform 106. A cradle 114 is provided which has tool base embracing tracks 116. The cradle 114 slidably engages the feed shell 112. The feed shell 112 transports the cradle 114 from a park position illustrated in FIG. 1 to a position substantially forward along the feed shell 112 shown in FIG. 2. In the park position (shown in FIG. 1) the cradle 114 is positioned such that the tool base embracing tracks 116 align with the tool base transfer tracks 108, allowing the tool bases 102 to be selectively transferred onto the cradle 114 creating an on-cradle tool base 102' (as noted in FIG. 2) while the remainder of the tool bases 102 are off-cradle tool bases 102". The on-cradle tool base 102' which resides on the cradle 114 and its associated on-cradle tool 104' can then be transported by the feed shell 112, as shown in FIG. 2, to a forward region of the feed shell 112 where the on-cradle tool 104' is in close proximity to the surface into which a bolt is to be set.

Figure 3:
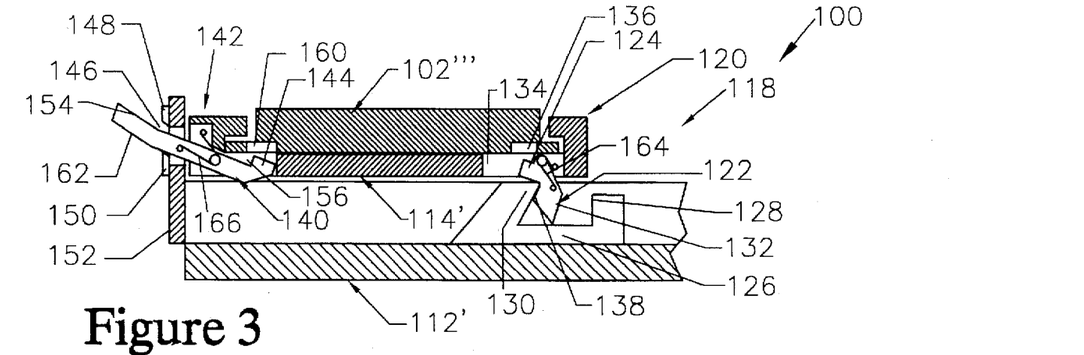
FIG. 3 is a sectional view of an on-cradle tool base securing system of the present invention which employs a front cradle latch and a rear cradle latch. The system is designed for the implementation on a tool selection and transport assembly similar to that illustrated in FIG. 1. The sectional view of FIG. 3 shows the cradle in the park position.

FIG. 3 is a section view of a tool selection and transport assembly 100', similar to the tool selection and transport assembly 100 shown in FIG. 1, but which incorporates as an on-cradle tool base securing system 118 of the present invention. In this embodiment, the cradle 114 has a front cradle section 120 to which is pivotably attached a front latch 122. The front latch 122 has a front tool base engaging lug 124 which is positioned such that when the cradle 114' is in the park position, the front tool base engaging lug 124 will lie below the on-cradle tool base 102'". A front latch engaging bracket 126 is provided which has a forward lip 128 and a rear lip 130.

Figure 2:
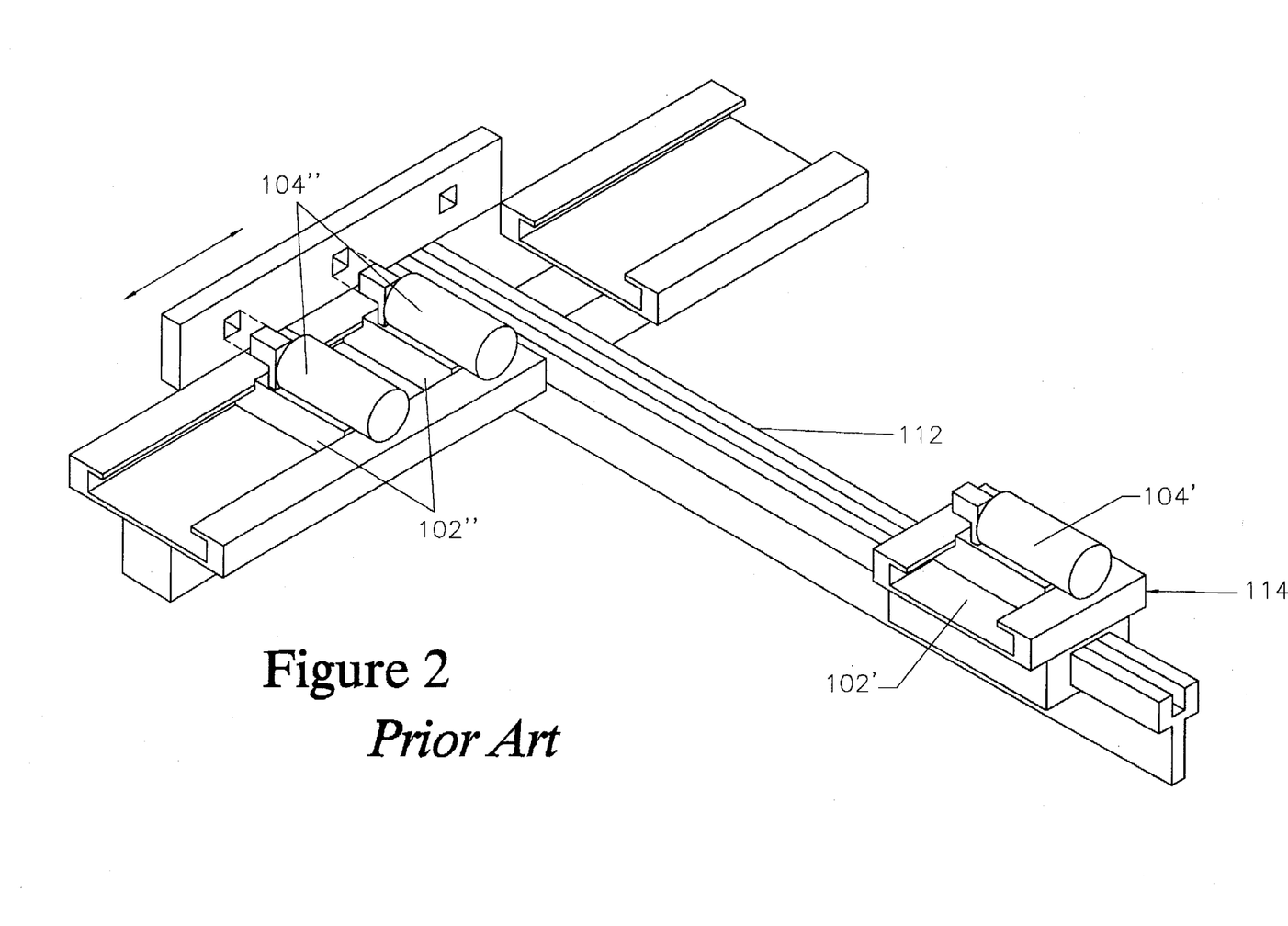
FIG. 2 is another isometric view of the tool selection and transport assembly illustrated in FIG. 1 where the cradle has been advanced along the feed shell to a position substantially forward of the park position.

The forward lip 128 of the front latch engaging bracket 126 serves as a front lug lifter which is fixed with respect to the transfer platform (not shown, essentially similar to transfer platform 106 illustrated in FIGS. 1 and 2). The front latch 122 is provided with a front lug raising surface 132 which is contoured such that as the cradle 114' is advanced from the park position, the front lug raising surface 132 engages the forward lip 128 of the front latch engaging bracket 126 and the front tool base engaging lug 124 is raised. As the front tool base engaging lug 124 rises, it passes through a front cradle slot 134 and into a front lug recess 136 in the on-cradle tool base 102'''. The front lug recess 136 is configured such that when the front tool base engaging lug 124 is engaged with the front lug recess 136, the on-cradle tool base 102''' is locked with respect to the front cradle section 120. In this embodiment, the forward lip 128 of the front latch engaging bracket 126 and the front lug raising surface 132 serve as means for engaging the front tool base engaging lug 124 with the on-cradle tool base 102''' and form a mechanical linkage which provides a positive action.

The rear lip 130 of the front latch engaging bracket 126 serves as a front lug depressor and, since the front latch engaging bracket 126 is attached to the feed shell 112, the rear lip 130 is fixed with respect to the transfer platform (similar to transfer platform 106 illustrated in FIGS. 1 and 2). The front latch 122 is provided with a front lug lowering surface 138 which is contoured such that as the cradle 114' is returning to the park position the front lug lowering surface 138 engages the rear lip 130 of the front latch engaging bracket 126 and the front tool base engaging lug 124 is lowered. As the front tool base engaging lug 124 is lowered, it is lowered into the front cradle slot 134 and out of the front lug recess 136. In this embodiment, the rear lip 130 of the front latch engaging bracket 126 and the front lug lowering surface 138 serve as means for disengaging the front tool base engaging lug 124 from the on-cradle tool base 102''' and form a mechanical linkage which provides a positive action.

When a single latch is employed it should be positioned as described above in the front cradle section 120 of the cradle 114. Having the latch so positioned will minimize any non-axial torque load on the tool base which results from the drill being advanced into the rock surface. Additionally, when the feed shell 112' is in a substantially vertical position, having the latch so positioned will cause the weight of the tool to help maintain centering as the tool is advanced.

To increase stability of the on-cradle tool base 102''' with respect to the cradle 114' against torque loads introduced by the drilling and bolt setting operations, it is preferred that a rear latch 140 be provided which is pivotably attached to a rear cradle section 142 of the cradle 114'.

The rear latch 140 has a rear tool base engaging lug 144 which lies below the on-cradle tool base 102' when the cradle 114' resides in the park position, as shown in FIG. 3.

A rear latch engaging passage 146 is provided which has an upper cam surface 148 and a lower cam surface 150. The rear latch engaging passage 146 resides in a base member 152 which is attached to the feed shell 112 and thus fixed with respect to the transfer platform (similar to transfer platform 106 illustrated in FIGS. 1 and 2). The upper cam surface 148 serves as a rear lug lifter. The rear latch 140 is provided with a rear lug raising surface 154 which is contoured such that as the cradle 114' is advanced from the park position, the rear lug raising surface 154 engages the upper cam surface 148 and the rear tool base engaging lug 144 is raised. As the rear tool base engaging lug 144 rises, it passes through a rear cradle slot 156 and into a rear lug recess 160 in the on-cradle tool base 102'''. Again, the rear lug recess 160 is configured such that when the rear tool base engaging lug 144 is engaged with the rear lug recess 160, the on-cradle tool base 102''' is locked with respect to the rear cradle section 142.

The lower cam surface 150 serves as a rear lug depressor which is fixably positioned with respect to the feed shell 112' and is thereby fixed with respect to the transfer platform (similar to transfer platform 106 shown in FIGS. 1 and 2). The rear latch 140 is provided with a rear lug lowering surface 162 which is contoured such that as the cradle 114' is returned to the park position, the rear lug lowering surface 162 engages the lower cam surface 150 and the rear tool base engaging lug 144 is lowered. As the rear tool base engaging lug 144 is lowered, it is retracted into the rear cradle slot 156 and out of the rear lug recess 160.

It should be appreciated that in the event one of the lug recesses (136, 160) should become plugged, the corresponding latch (122 or 140) would not pivot with respect to the cradle 114 and forward motion of the cradle 114'', would be stopped before the cradle 114 is advanced from the park position. This feature assures that the on cradle tool 104''' cannot be advanced along the feed shell 112' without being secured with respect to the cradle 114' thereby eliminating the possibility that the on-cradle tool base 102''' might fall from the cradle 114' while the cradle 114' is in transit.

Again, it should be appreciated that in the event one of the lug recesses (136, 160) should not release the lug deposed therein as the cradle 114' is returning to the park position, the corresponding latch (122 or 140) would not pivot with respect to the cradle 114' and the cradle 114' would be stopped before the cradle 114' was parked, giving notice to the operator that a problem exists. This feature assures that an on-cradle tool 104''' cannot be parked in a condition where the on-cradle tool base 102''' cannot be moved off the cradle 114'.

The on-cradle tool base securing system 118 of FIG. 3 also includes a front coil spring 164 which, while not needed to raise the front tool base engaging lug 124, does serve as a biasing means to maintain the front tool base engaging lug 124 engaged while the cradle 114' is in transit and serves as means for maintaining the front tool base engaging lug 124 engaged with the on-cradle tool base 102'''.

Similarly, the on-cradle tool base securing system 118 also includes a rear coil spring 166 which again, while not needed to raise the rear tool base engaging lug 144, does serve as a biasing means to maintain the rear tool base engaging lug 144 engaged while the cradle 114' is in transit and serves as means for maintaining the rear tool base engaging lug 144 engaged with the on-cradle tool base 102'''.

FIGS. 3 through 6 illustrate how the front and rear latches (122 and 140) operate to engage and disengage the front and rear tool base engaging lugs (124 and 144) with the on-cradle tool base 102''' as the cradle 114' moves along the feed shell 112'. FIG. 3, as discussed earlier, illustrates the cradle 114' in the park position. In this position, the front latch 122 is positioned such that the rear lip 130 is engaged with the front lug lowering surface 138 and the front tool base engaging lug 124 is disengaged from the front lug recess 136 in the on-cradle tool base 102'''. Similarly, the rear latch 140 is positioned such that the lower cam surface 150 is engaged with the rear lug lowering surface 162 and the rear tool base engaging lug 144 is disengaged from the rear lug recess 160 in the on-cradle tool base 102'''.

Figure 4:
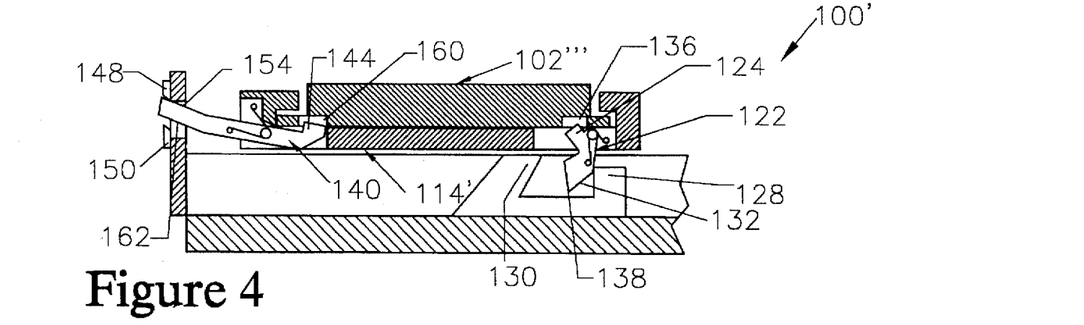
FIG. 4 is a similar view of the embodiment of FIG. 3; however, the cradle has been incrementally advanced from the park position. As illustrated the cradle has advanced to a point where the front and rear lug raising surfaces are respectively engaging the front and rear lug lifters. The front and rear tool base engaging lugs are partially engaged with the on-cradle tool base.

FIG. 4 shows the cradle 114' advanced slightly from the park position. In this position, the front latch 122 has advanced such that the front lug lowering surface 138 has drawn away from the rear lip 130, and the forward lip 128 is in sliding contact with the front lug raising surface 132. This sliding contact causes the front latch 122 to pivot, which in turn causes the front tool base engaging lug 124 to become partially engaged with the front lug recess 136. Similarly, the rear latch 140 has advanced such that the rear lug lowering surface 162 has drawn away from the lower cam surface 150 and the upper cam surface 148 is in sliding contact with the rear lug raising surface 154. This sliding contact causes the rear latch 140 to pivot, which in turn causes the rear tool base engaging lug 144 to become partially engaged with the rear lug recess 160. Although the pivoting actions of the front and rear latches (122 and 140) are shown occurring simultaneously, it should be appreciated that they could also occur sequentially. The timing of engagement of the rear tool base engaging lug 144, for example, can be readily adjusted by varying the position of the upper cam surface 148.

Figure 5:
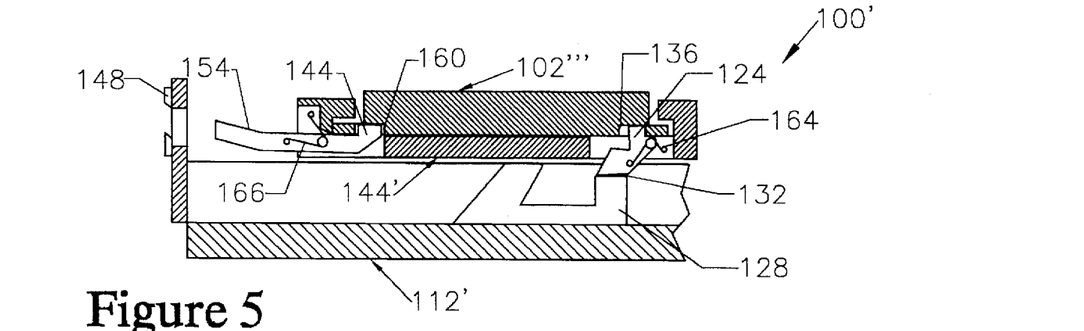
FIG. 5 is the same section as FIGS. 3 and 4 and shows the tool base securing system at a point where the front and rear tool base engaging lugs have become fully engaged with the on-cradle tool base. At this point, the coil springs provide a biasing force to maintain the tool base engaging lugs in position as the cradle advances along the feed shell.

FIG. 5 illustrates the cradle 114 when it is further removed from the park position on the feed shell 112'. As illustrated, the front lug raising surface 132 has moved past the forward lip 128 and the front tool base engaging lug 124 is now in full contact with the front lug recess 136 and will be maintained there by the front coil spring 164 as the cradle 114' continues to advance along the feed shell 112'. Similarly, the rear lug raising surface 154 has moved past the upper cam surface 148 and the rear tool base engaging lug 144 is in full contact with the rear lug recess 160 and will be maintained there by the rear coil spring 166. While the embodiment illustrated in FIGS. 3 through 6 employs springs as the means of maintaining the front and rear tool base engaging lugs engaged with the front and rear lug recesses, it should be appreciated that alternate means, such as providing a frictional fit between the tool base engaging lugs and the lug recesses could be employed.

Figure 6:
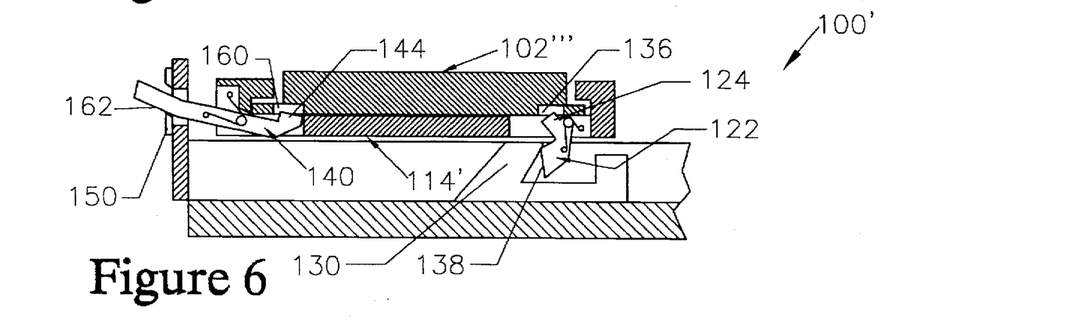
FIG. 6 shows the on-cradle tool base securing system of FIGS. 3 through 5; however, the cradle as illustrated is being retracted and is returning to the park position. As illustrated, the front and rear lug lowering surfaces are respectively engaging the front and rear lug depressors, pivoting the front and rear latches against the bias of the coil springs and rotating the front and rear tool base engaging lugs so that they are partially disengaged from the on-cradle tool base.

FIG. 6 illustrates the cradle 114 as it is returning to the park position. At the location shown the front latch 122 is positioned such that the front lug lowering surface 138 is in sliding contact with the rear lip 130. This sliding contact causes the front latch 122 to pivot, which in turn results in the front tool base engaging lug 124 partially withdrawing from the front lug recess 136. Similarly, the rear latch 140 has advanced such that the rear lug lowering surface 162 is in sliding contact with the lower cam surface 150. This sliding contact causes the rear latch 140 to pivot, which in turn results in the rear tool base engaging lug 144 being partially withdrawn from the rear lug recess 160. Although the pivoting actions of the front and rear latches (122 and 140) are shown occurring simultaneously, it should be appreciated that they could also occur sequentially. The timing of the disengagement of the rear tool base engaging lug can be readily altered by adjusting the position of the lower cam surface 150.

Again, FIG. 3 illustrates the cradle 114' when it has completely returned to the park position. The front latch 122 has pivoted such that the front tool base engaging lug 124 is disengaged from the front lug recess 136 in the on-cradle tool base 102'''. Similarly, the rear latch 140 has pivoted such that the rear tool base engaging lug 144 is disengaged from the rear lug recess 160 in the on-cradle tool base 102'.

Figure 7:
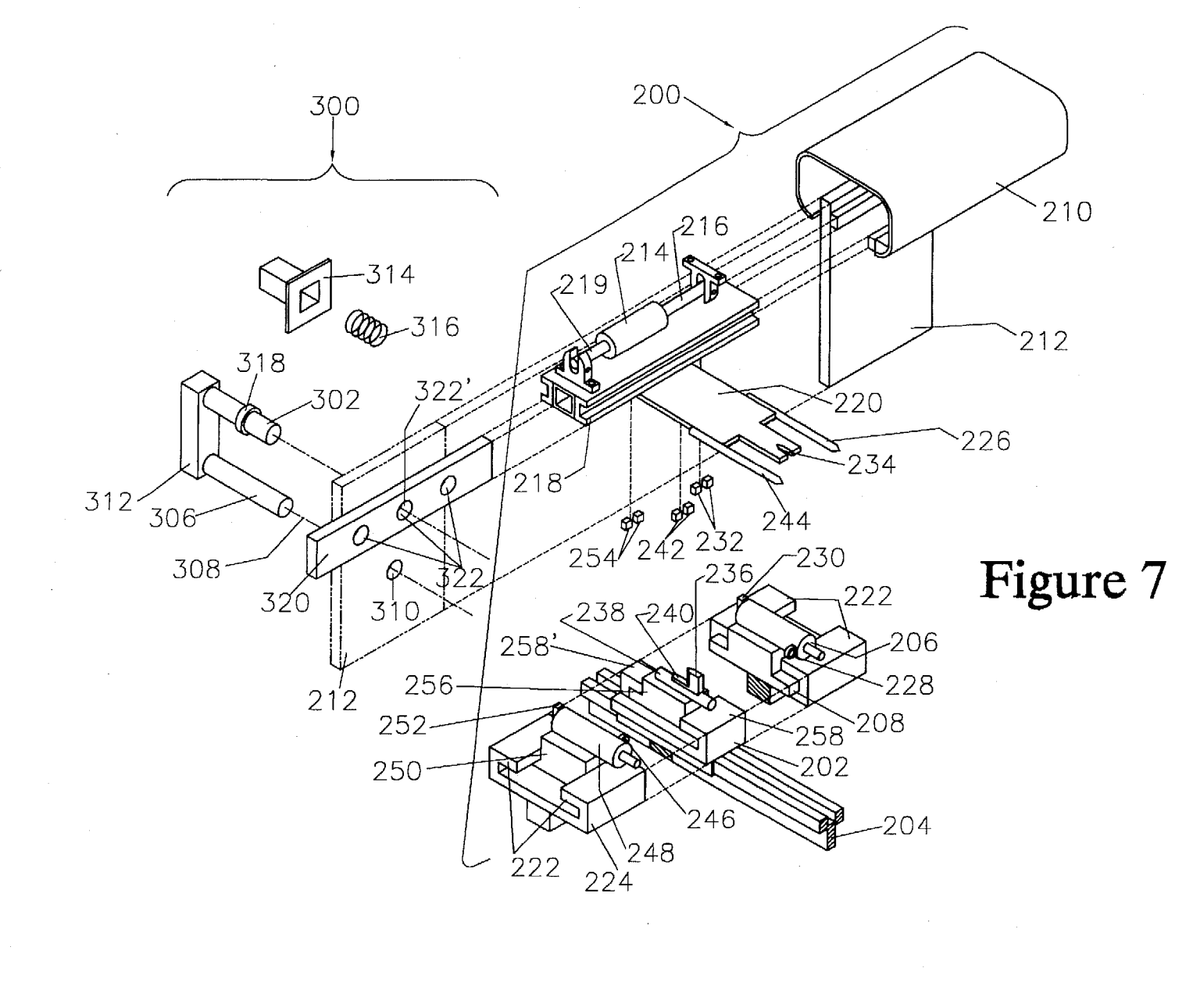
FIG. 7 is an exploded isometric view of a cradle transport system and off-cradle tool base immobilization system which is suitable for use with an on-cradle tool base securing system such as the on-cradle tool base securing system illustrated in FIGS. 3 through 6. The immobilization system is released by a stop rod when the stop rod is displaced by the cradle. In this embodiment, the stop rod is connected to a tie bar which in turn is connected to a locking plunger.
Figure 9:
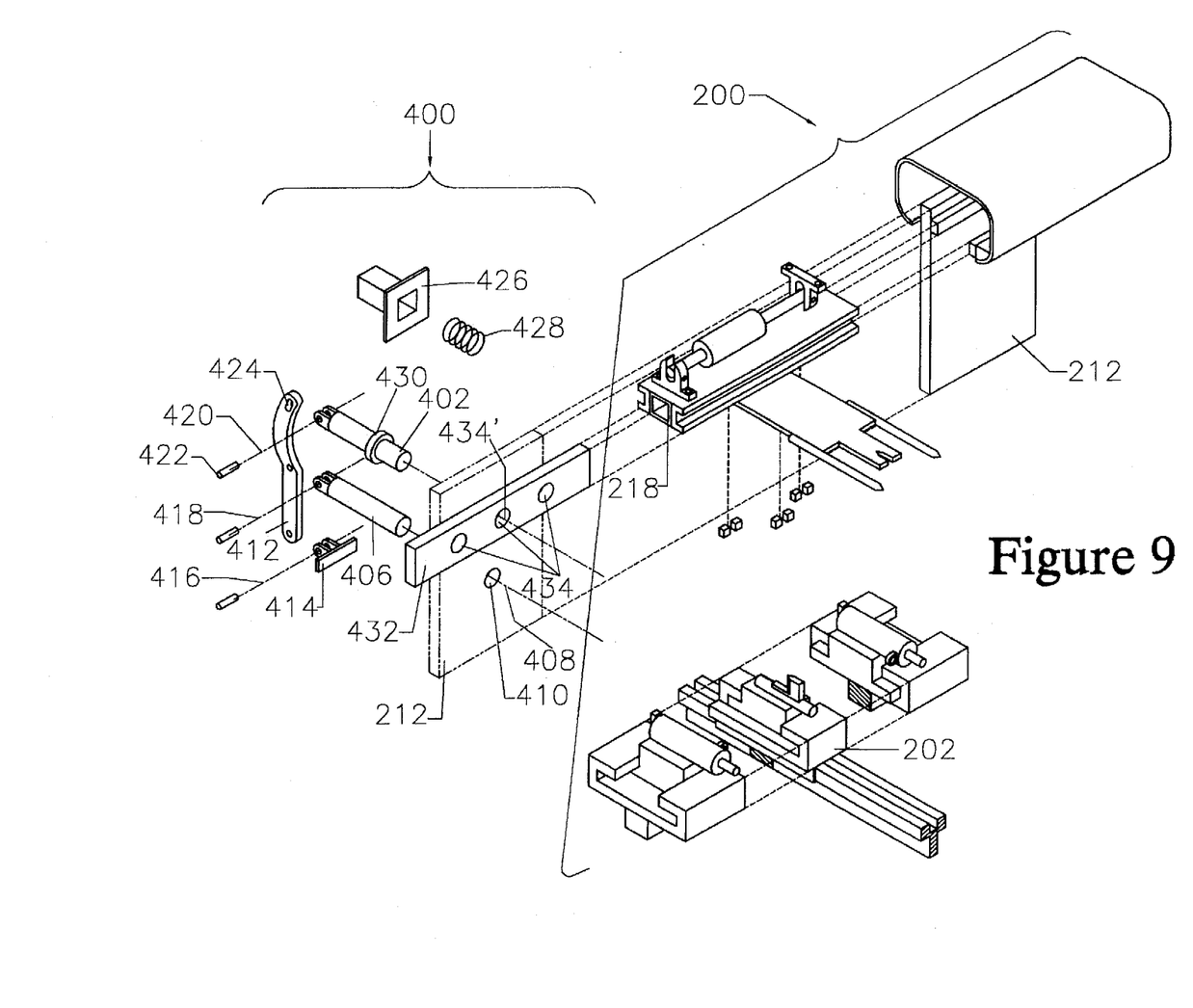
FIG. 9 is an exploded isometric view of the cradle transport system illustrated in FIGS. 7 and 8 and an alternate off-cradle tool base immobilization system which connects a locking plunger to a stop rod with a pivot arm, the pivot arm in turn being connected to a base transfer member.

FIGS. 7 and 9 are exploded isometric views, each of which contain an improved transfer mechanism 200 for moving rock bolting tools onto and off of a cradle 202 where they can be advanced along a feed shell 204. For example, a rock drill 206 and its associated rock drill base 208 can be moved onto and off of the cradle 202 which in turn is slidably engaged with the feed shell 204. The cradle 202 allows the rock drill 206 to be advanced to a forward region of the feed shell 204 where a drill steel (not shown) contained in the rock drill 206 is in contact with the surface into which the bolt is to be set. The transfer mechanism 200 has a transfer slider track fixture 210 which is attached to a transfer base member 212. It should be appreciated that the base member 152 described for the embodiment of FIGS. 3 through 6 could be configured to also serve as the base transfer member 212. The base transfer member 212 in turn is attached to the feed shell 204. The transfer slider track fixture 210 has attached thereto a three position linear actuator 214, such as a dual action hydraulic piston. A first activator rod 216 couples the linear actuator 214 to the transfer slider track fixture 210. Slidably engaging the transfer slider track fixture 210 is a transfer slider 218 which is positioned by a second activating rod 219 of the linear actuator 214 which is coupled to the transfer slider 218. The transfer slider 218 has a transfer plate 220 attached thereto. The transfer slider 218 and transfer plate 220 traverse a path parallel to transfer tracks 222 of a transfer platform 224 which guide the bases of the rock bolting tools onto the cradle 202. The transfer plate 220 has a rock drill stabilizer rod 226 which engages a rock drill eye 228 positioned on the forward portion of the rock drill 206. A rock drill base tab 230 is attached to the rock drill base 208 and positioned to engage rock drill tab blocks 232 attached to the transfer slider 218. It should be appreciated by one skilled in the art that the eyes and tabs could be mounted on either the tool or the base.

Similarly, a resin injector stabilizer fork 234 forms part of the transfer plate 220 and engages a front resin injector tab 236 on the front of a resin injector 238. A resin injector back tab 240 is provided which is attached to the resin injector 238. The resin injector back tab 240 engages a rear injector tab bracket 242 attached to the transfer plate 220.

The transfer plate 220 also has a rock bolt driver stabilizer rod 244 which engages a rock bolt driver eye 246 positioned on the forward portion of a rock bolt driver 248 mounted on a rock bolt driver base 250. A rock bolt driver base tab 252 is attached the rock bolt driver base 250 and positioned to engage rock bolt driver tab blocks 254 attached to the transfer slider 218.

Since the resin injector 238 is substantially smaller than the rock drill 206 or the rock bolt driver 248, it can be mounted on a narrower resin injector base 256 which is narrower than the rock drill and rock bolt driver bases (208 and 250). This reduction in width of the resin injector base 256 allows the overall length of the transfer platform 224 to be reduced if provisions are made to allow the rock drill base 208 and the rock bolt driver base 250 to overlap the cradle 202. This overlap can be provided by employing a forward tool base embracing track 258 which extends the width of the cradle 202, while a rear tool base embracing track 258' is provided which is centered with respect to the width of the cradle 202 but foreshortened to the extent of the overlap of the rock drill and rock bolt driver bases (208 and 250) thereby allowing the cradle 202 to advance while the rock drill and rock bolt driver bases (208 and 250) partially overlap the cradle 202. This provision allows foreshortening of the transfer platform 224 which is advantageous due to the limited operating space in a mine where rock bolters are frequently employed.

The three-position linear actuator 214 allows the operator of the transfer mechanism 200 to index between the three positions to select the tool needed to perform the desired operation.

The transfer mechanism 200 is provided with an immobilization system which immobilizes the tool bases which are off-cradle when the cradle 202 is removed from the park position and advanced along the feed shell 204. The immobilization system will prevent the operator from accidentally moving the off-cradle tool bases which reside on the transfer platform 224 when the cradle 202 is not in a position to accept them.

Figure 8:
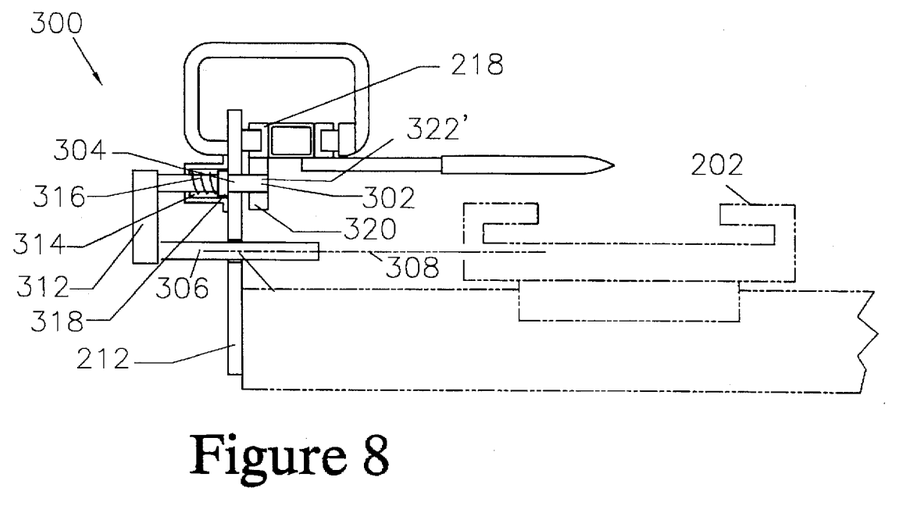
FIG. 8 is a non-exploded section view of the isometric view of FIG. 7 and illustrates the connectivity of the various elements of the embodiment including the stop rod and locking plunger, and their relationship to each other and to an indexing plate.

In the embodiment of FIGS. 7 and 8 an immobilization system 300 is provided by a locking plunger 302 which slidably engages a locking plunger passage 304 (shown in FIG. 8) which is provided in the transfer base member 212 and serves as a locking plunger support. A stop rod 306 having a stop rod axis 308 is provided, the stop rod 306 passing through a stop rod passage 310 in the base transfer member 212. The stop rod passage 310 is so positioned that the stop rod axis 308 will intersect the cradle 202 and the stop rod 306 will engage the cradle 202 as the cradle 202 approaches the park position. A tie bar 312 is provided which fixably connects the stop rod 306 with respect to the locking plunger 302. A plunger chamber 314 which attaches to the transfer base member. 212 is provided. The plunger chamber 314 is positioned such that the locking plunger 302 passes therethrough. A plunger spring 316 residing in the plunger chamber 314 surrounds the locking plunger 302. A spring retainer 318 is provided on the locking plunger 302 and is forcibly engaged by the plunger spring 316 when the spring retainer 318 resides at the plunger passage 304. The spring retainer 318 is configured so as not to pass through the locking plunger passage 304.

An index plate 320 is provided which attaches to the transfer slider 218. The index plate 320 has plunger passages 322 which are configured to accept the locking plunger 302. The plunger passages 322 are positioned with respect to the tool bases (208, 250, and 256) such that when one of the tool bases is positioned on the cradle 202, providing an on-cradle tool base (As illustrated in FIG. 7, the on-cradle tool base is the resin injector base 256), the corresponding plunger passage 322' which corresponds to the on-cradle tool base is aligned with the locking plunger 302.

Figure 10:
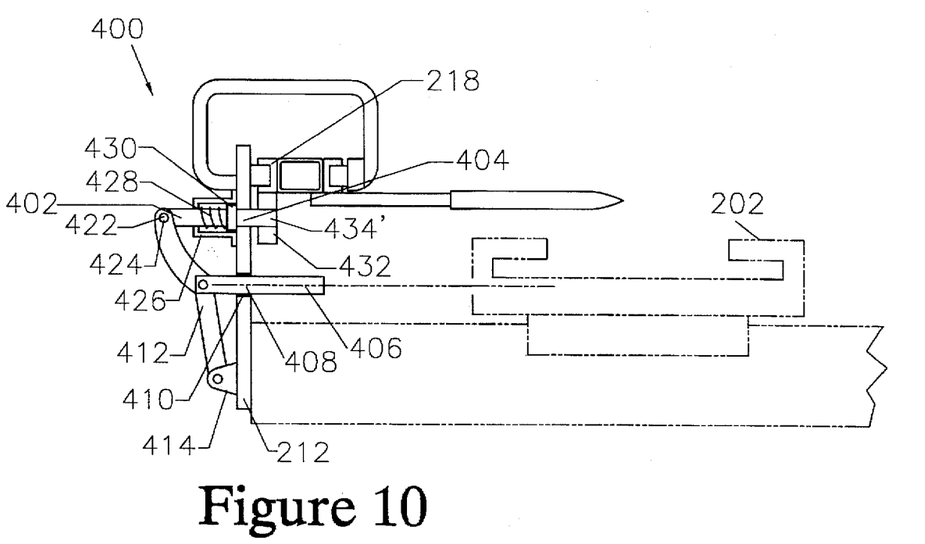
FIG. 10 is a non-exploded section view of the isometric view of FIG. 9 and illustrates the connectivity of the various elements of the embodiment including the stop rod, the locking plunger, and the pivot arm, and their relationship to each other and to an indexing plate.

FIGS. 9 and 10 show an alternate immobilization system 400. The immobilization system 400 is provided by a locking plunger 402 which slidably engages a locking plunger passage 404 (shown in FIG. 10) which is provided in the transfer base member 212 and serves as a locking plunger support. A stop rod 406 having a stop rod axis 408 is provided, the stop rod 406 passing through a stop rod passage 410 in the transfer base member 212. The stop rod passage 410 is so positioned that the stop rod axis 408 will intersect the cradle 202 and the stop rod 406 will engage the cradle 202 as the cradle 202 approaches the park position.

A pivot arm 412 is pivotably attached to the transfer base member 212 by a base bracket 414. The pivot arm 412 pivots about the transfer base member 212 about a transfer base pivot axis 416. The pivot arm 412 is also pivotably connected to the stop rod 406 and pivots about a stop rod pivot axis 418. Similarly, the pivot arm 412 is also pivotably attached to the locking plunger 402 and pivots about a plunger pivot axis 420. The connection of the stop rod 406 to the pivot arm 412 is between the transfer base pivot axis 416 and the plunger pivot axis 420. Having the stop rod 406 and locking plunger 402 so connected provides mechanical advantage and results in a translation of the locking plunger 402 which is greater than that of the stop rod 406.

When a pivot arm is connected to the transfer base member 212 and to the locking plunger 402, binding of the locking plunger 402 with the locking plunger passage 404 is to be avoided. Binding can be avoided by providing means for varying the separation between the plunger pivot axis 420 and the transfer base pivot axis 416, which will allow the separation to vary as the pivot arm 412 rotates. In the embodiment of FIGS. 9 and 10, the means for varying the separation between the axes (416 and 420) is provided by connecting the locking plunger 402 to the pivot arm 412 with a plunger pin 422 which passes through a plunger pin slot 424 in the pivot arm 412. It should be appreciated that means for varying the separation of the axes (416 and 420) could alternately be provided by a pin and slot connection of the pivot arm 412 to the base bracket 414.

Similarly, when a pivot arm is employed, binding of the stop rod 406 in the stop rod passage 410 must be avoided. In the embodiment of FIGS. 9 and 10, binding is eliminated by making the stop rod passage 410 oversized with respect to the stop rod 406. It should be appreciated that an alternate means for preventing binding of the stop rod 406 in the stop rod passage 410 would be to connect the stop rod 406 to the pivot arm 412 with a pin and slot connection similar to the plunger pin and plunger pin slot (422 and 424) described above.

Again, as with the embodiment of FIGS. 7 and 8, a plunger chamber 426 is provided which attaches to the transfer base member 212. The plunger chamber 426 is positioned such that the locking plunger 402 passes therethrough. A plunger spring 428 residing in the plunger chamber 426 surrounds the locking plunger 402. A spring retainer 430 is provided on the locking plunger 402 and is engaged by the plunger spring 428 when the spring retainer 430 resides at the locking plunger passage 404. The spring retainer 430 is configured so as not to pass through the locking plunger passage 404.

An index plate 432 is provided having plunger passages 434. The index plate 432 attaches to the transfer slider 218 and is configured similarly to the index plate 320 described above.

While the immobilization systems shown in FIGS. 7 through 10 employ stop rods which reside at all times in the stop rod passage in the base transfer member and are engaged by the cradle as it returns to the park position, it is possible to attach the stop rod to the cradle. When the stop rod is attached to the cradle, the movement of the cradle as it approaches the park position serves to advance the stop rod through the stop rod passage.

Figure 11:
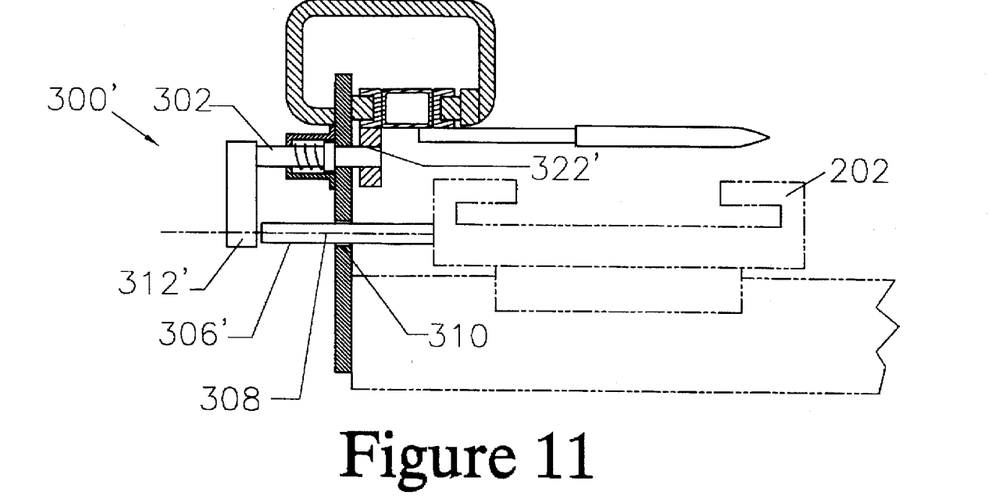
FIG. 11 is a section view of an embodiment similar to the embodiment illustrated in FIGS. 7 and 8. This embodiment differs in that a stop rod is attached to the cradle and, as the cradle approaches the park position, the stop rod engages a tie bar which is connected locking plunger.

FIG. 11 shows a section of an alternate immobilization system 300' which is similar to the immobilization system 300 shown in FIGS. 7 and 8. The immobilization system 300' employs a stop rod 306' which is attached to the cradle 202 (shown in phantom). As the cradle 202 approaches the park position, the stop rod 306' is advanced through the stop rod passage 310 and engages a tie bar 312', which is positioned to intersect the stop rod axis 308, and moves the tie bar 312' rearward. The tie bar 312' is fixably attached to the locking plunger 302 and the rearward motion of the tie bar 312' serves to withdraw the locking plunger 302 from the corresponding plunger passage 322'.

Figure 12:
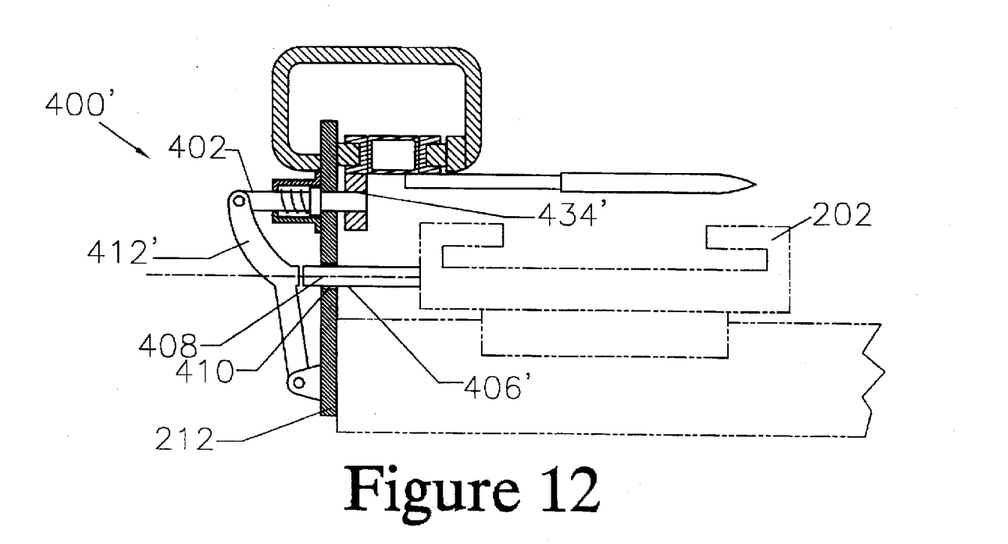
FIG. 12 is a section view of an embodiment similar to the embodiment illustrated in FIGS. 9 and 10. This embodiment again differs in that a stop rod is attached to the cradle and, as the cradle approaches the park position, the stop rod engages a pivot arm which is pivotably connected to both a locking plunger and a base transfer member.

FIG. 12 shows a section of another alternate immobilization system 400' which is similar to the immobilization system 400 shown in FIGS. 9 and 10. The immobilization system 400' employs a stop rod 406' which is attached to the cradle 202 (shown in phantom). As the cradle 202 approaches the park position, the stop rod 406' is advanced through the stop rod passage 410 and engages a pivot arm 412' which is positioned to intersect the stop rod axis 408. The pivot arm 412' is pivotably connected to the transfer base member 212 and to the locking plunger 402 in a manner similar to the connection of the pivot arm 412 of the immobilization system 400. As the stop rod 406' engages the pivot arm 412' it rotates the pivot arm 412' away from the transfer base member 212. This rotation of the pivot arm 412' serves to withdraw the locking plunger 402 from the corresponding plunger passage 434'.

When immobilization means such as the immobilization system 300 of FIGS. 7 and 8, the immobilization system 400 of FIGS. 9 and 10, the immobilization system 300' of FIG. 11, or the immobilization system 400' of FIG. 12 are employed in combination with the rear latch 140 and rear latch engaging passage 146 of FIGS. 3 through 6, it should be appreciated that the plane of the stop rod and locking plunger should be different from the plane of the rear latch and rear latch engaging passage to avoid interference between these elements. Alternatively, a rear latch and rear latch engaging bracket similar to the front latch 122 and front latch engaging bracket 126 of FIGS. 3 through 6 could be employed.

As noted earlier in the Summary of the Invention, it is also possible to provide a means for retracting a locking plunger of an immobilization system which does not require a stop rod. Two such immobilization systems are illustrated in FIGS. 13 and 14.

Figure 13:
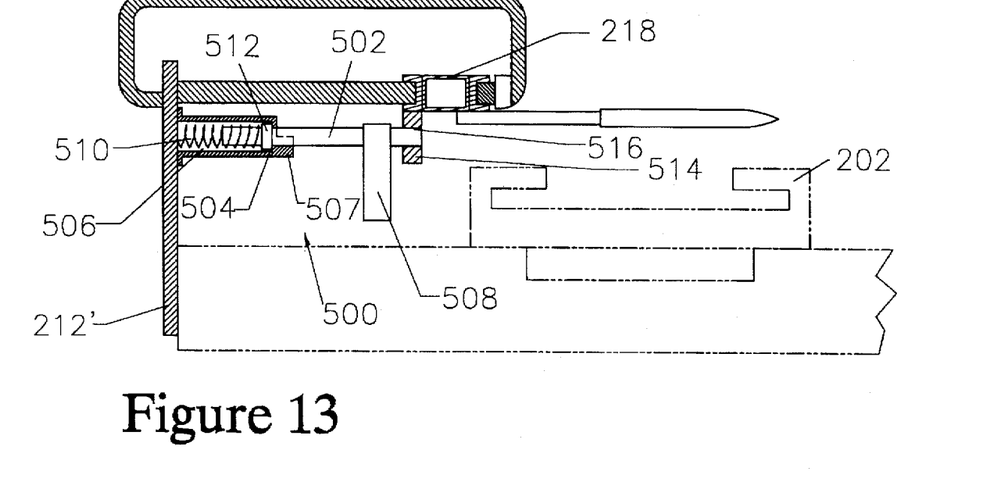
FIG. 13 is a section view of an alternative immobilization system which does not employ a stop rod. The locking plunger is attached to a tie bar which engages the cradle when the cradle returns to the park position.

FIG. 13 illustrates one immobilization system 500 which employs a locking plunger 502 which slidably engages a locking plunger passage 504 in one end of a plunger chamber 506. The plunger chamber 506 is attached to a base transfer member 212' of the improved transfer mechanism 200 and is provided with a plunger support channel 507 which extends from the locking plunger passage 504. The plunger support channel 507, in combination with the locking plunger passage 504, provides a locking plunger support. A tie bar 508 is fixably attached to the locking plunger 502, forming a stop which is positioned to engage the cradle 202 as the cradle 202 approaches the park position. A plunger spring 510 is provided in the plunger chamber 506 and engages a spring retainer 512 on the locking plunger 502. The plunger spring 510 biases the locking plunger 502 toward an index plate 514 when it is aligned with a plunger passage 516. The index plate 514 is attached to the transfer slider 218. When the cradle 202 approaches the park position, it engages the stop bar 508 and moves it rearward. The rearward motion of the stop bar 508 causes the attached locking plunger 502 to move rearward, against the bias of the plunger spring 510, out of engagement with the aligned plunger passage 516.

Figure 14:
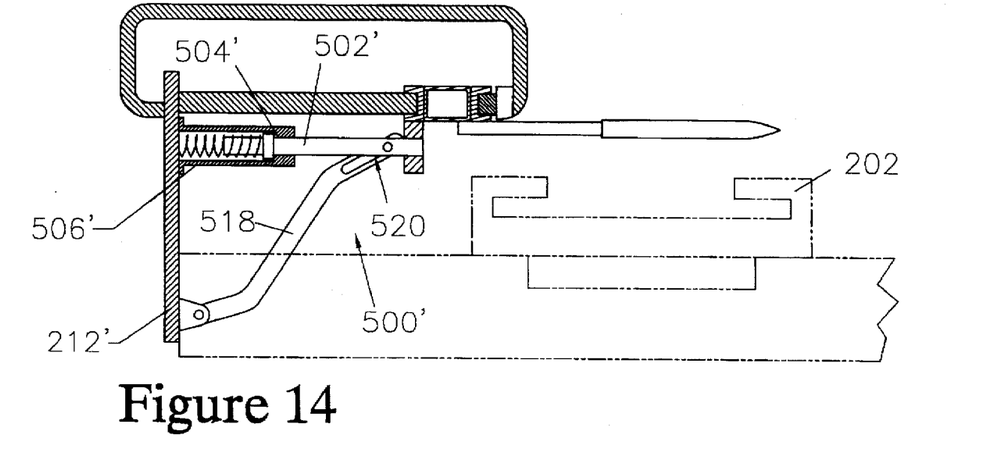
FIG. 14 is an embodiment similar to that of FIG. 13, but employs a pivot arm connected to the locking plunger and positioned to engage the cradle.

FIG. 14 illustrates an alternative immobilization system 500' which is similar to the immobilization system 500 but employs a locking plunger 502' which slidably engages a locking plunger passage 504' in one end of a plunger chamber 506'. The locking plunger passage 504' is of sufficient length to serve as a locking plunger support, eliminating the need for a support channel such as the plunger support channel 507 of the embodiment of FIG. 13. The locking plunger 502' differs from the locking plunger 502 in that it is pivotably connected to a pivot arm 518 by a pin and slot connection 520. The pivot arm 518 is in turn pivotably connected to the base transfer member 212' and is so positioned as to engage the cradle 202 when the cradle 202 approaches the park position.

While the invention has been described in terms of preferred embodiments, it should be appreciated that variations are possible without departing from the spirit of the invention.

What I claim is:

1. An improved rock bolter, the rock bolter having:
   tool bases on which bolt setting tools are mounted;
   a transfer platform with tool base transfer tracks for slidably engaging and guiding the tool bases;
   a cradle having tool base embracing tracks, a cradle front section, and a cradle rear section;
   a transfer slider for positioning the tool bases on the transfer platform and the cradle such that one of the tool bases becomes an on-cradle tool base and is positioned on the cradle with the remaining tool bases being defined as off-cradle tool bases; and
   a feed shell on which the cradle rides providing for advancement of the on-cradle tool base from a park position wherein the tool base embracing tracks are aligned with the tool base transfer tracks to a forward region of the feed shell near a surface where a rock bolt is to be installed;
   the improvement comprising a tool base securing system having:
   a front latch pivotably mounted on the front section of the cradle, said front latch having a front tool base engaging lug for engaging the on-cradle tool base;
   means for engaging said front tool base engaging lug with the on-cradle tool base as the cradle is advanced along the feed shell from the park position toward the forward region of the feed shell, said means for engaging said front tool base engaging lug being a mechanical linkage designed to block advancement of the cradle unless said front tool base engaging lug is engaged with the on-cradle tool base;
   means for disengaging said front tool base engaging lug from the on-cradle tool base as the cradle is returned to the park position, said means for disengaging said front tool base engaging lug being a mechanical linkage designed to prevent return of the cradle to the park position unless said front tool base engaging lug is disengaged from the on-cradle tool base; and
   means for maintaining said front tool base engaging lug engaged with the on-cradle tool base when the cradle traverses the feed shell.

2. The tool base securing system of claim 1 further comprising:
   a rear latch mounted on the rear section of the cradle, said rear latch having a rear tool base engaging lug for engaging the on-cradle tool base;
   means for engaging said rear tool base engaging lug with the on-cradle tool base as the cradle is advanced along the feed shell from the park position toward the forward region of the feed shell, said means for engaging said rear tool base engaging lug being a mechanical linkage designed to block advancement of the cradle unless said rear tool base engaging lug is engaged with the on-cradle tool base;
   means for disengaging said rear tool base engaging lug from the on-cradle tool base as the cradle is returned to the park position, said means for disengaging said rear tool base engaging lug being a mechanical linkage designed to prevent return to the park position unless said rear tool base engaging lug is disengaged from the on-cradle tool base; and
   means for maintaining said rear tool base engaging lug engaged with the on-cradle tool base when the cradle traverses the feed shell.

3. The tool base securing system of claim 2 wherein said means for engaging said front tool base engaging lug further comprise:

a front lug lifter fixed with respect to the transfer platform;

a front lug raising surface forming part of said front latch, said front lug raising surface being contoured such that as the cradle is advanced from the park position said front lug lifter engages said front lug raising surface to bring said front tool base engaging lug into engagement with the on-cradle tool base;

further wherein said means for disengaging said front tool base engaging lug further comprise:

a front lug depressor fixed with respect to the transfer platform; and a front lug lowering surface forming part of said front latch, said front lug lowering surface being contoured such that as the cradle is returned to the park position said front lug depressor engages said front lug lowering surface to remove said front tool base engaging lug from engagement with the on-cradle tool base.

still further wherein said means for engaging said rear tool base engaging lug further comprise:

a rear lug lifter fixed with respect to the transfer platform; and a rear lug raising surface forming part of said rear latch, said rear lug raising surface being contoured such that as the cradle is advanced from the park position said rear lug lifter engages said rear lug raising surface to bring said rear tool base engaging lug into engagement with the on-cradle tool base;

yet further wherein said means for disengaging said rear tool base engaging lug further comprise:

a rear lug depressor fixed with respect to the transfer platform; and a rear lug lowering surface forming part of said rear latch, said rear lug lowering surface being contoured such that as the cradle is returned to the park position said rear lug depressor engages said rear lug lowering surface to remove said rear tool base engaging lug from engagement with the on-cradle tool base.

4. The tool base securing system of claim 2 wherein said means for maintaining said front tool base engaging lug engaged with the on-cradle tool base and said means for maintaining said rear tool base engaging lug engaged with the on-cradle tool base further comprise:

biasing means to maintain said front tool base engaging lug and said rear tool base engaging lug engaged with the on-cradle tool base when the cradle is displaced from its park position.

5. The tool base securing system of claim 4 wherein said biasing means are coil springs.

6. The tool base securing system of claim 5 further comprising:

means for immobilizing the off-cradle tool bases when the cradle is advanced from the park position.

7. The tool base securing system of claim 6 wherein said means for. immobilizing the off cradle tool bases further comprise:

a locking plunger;

a transfer base member fixably positioned with respect to the feed shell, said transfer base member having a locking plunger passage through which said locking plunger passes;

an indexing plate connected to the transfer slider, said indexing plate having plunger passages therein, each of said passages being configured to accept said locking plunger and positioned with respect to the tool bases such that when one of the tool bases is positioned oil the cradle to provide the on-cradle tool base, a corresponding plunger passage will align with said locking plunger;

means for biasing said locking plunger such that said locking plunger will be advanced toward said indexing plate engaging said corresponding plunger passage as the cradle leaves the park position and advances the on-cradle tool base toward the forward region of the feed shell; and means for disengaging said locking plunger from said corresponding plunger passage responsive to the cradle entering the park position.

8. The tool base securing system of claim 7 wherein said means for biasing said locking plunger further comprises:

a plunger chamber attached to said transfer base member positioned such that said locking plunger passes therethrough;

a plunger spring housed in said plunger chamber; and means for engaging said plunger spring with said locking plunger to bias said locking plunger toward said index plate.

9. The tool base securing system of claim 8 wherein said means for disengaging said locking plunger from said corresponding plunger passage further comprises:

a stop rod having a stop rod axis, said stop rod being aligned with a stop rod passage in said transfer base member, said stop rod passage being positioned such that said stop rod axis intersects the cradle;

means for translating said stop rod through said stop rod passage as the cradle approaches the park position; and means for withdrawing said locking plunger from said corresponding plunger passage responsive to said translation of said stop rod as the cradle approaches the park position.

10. The tool base securing system of claim 9 wherein said stop rod is affixed to the cradle thereby providing said means for translating said stop rod as the cradle approaches the park position; and said means for withdrawing said locking plunger further comprising:

a tie bar affixed to said locking plunger and positioned to engage said stop rod as the cradle approaches the park position.

11. The tool base securing system of claim 1 wherein said means for maintaining said front tool base engaging lug engaged with the on-cradle tool base and said means for maintaining said rear tool base engaging lug engaged with the on-cradle tool base further comprise:

biasing means to maintain said front tool base engaging lug and said rear tool base engaging lug engaged with the on-cradle tool base when the cradle is displaced from its park position.

12. The tool base securing system of claim 11 wherein said biasing means are coil springs.

13. The tool base securing system of claim 1 further comprising:

means for immobilizing the off-cradle tool bases when the cradle is advanced from the park position.

14. An improved rock bolter, the rock bolter having:

tool bases on which bolt setting tools are mounted;

a transfer platform with tool base transfer tracks for slidably engaging and guiding the tool bases;

a cradle having tool base embracing tracks;

a transfer slider for positioning the tool bases on the transfer platform and the cradle such that one of the tool bases becomes an on-cradle tool base and is positioned on the cradle with the remaining tool bases being off-cradle tool bases; and a feed shell on which the cradle rides providing for advancement of the on-cradle tool base from a park position wherein the tool base embracing tracks are aligned with the tool base transfer tracks to a forward region of the feed shell near a surface where a rock bolt is to be installed;

the improvement comprising an off-cradle tool base immobilization system having:

a locking plunger;

a transfer base member fixably positioned with respect to the feed shell, said transfer base member having connected thereto a locking plunger support, said locking plunger slidably engaging said locking plunger support;

an indexing plate connected to the transfer slider, said indexing plate having plunger passages therein, each of said plunger passages being configured to accept said locking plunger and positioned with respect to the tool bases such that when one of the tool bases is positioned on the cradle providing the on-cradle tool base, a corresponding plunger passage will align with said locking plunger;

means for biasing said locking plunger such that said locking plunger will be advanced toward said indexing plate engaging said corresponding plunger passage as the cradle leaves the park position and advances the on-cradle tool base toward the forward region of the feed shell; and means for disengaging said locking plunger from said corresponding plunger passage responsive to the cradle entering the park position.

15. The off-cradle tool base immobilization system of claim 14 wherein said locking plunger support is a locking plunger passage through said base transfer member and further wherein said means for biasing said locking plunger further comprises:

a plunger chamber attached to said transfer base member positioned such that said locking plunger passes therethrough;

a plunger spring housed in said plunger chamber; and means for engaging said plunger spring with said locking plunger to bias said locking plunger toward said indexing plate.

16. The off-cradle tool base immobilization system of claim 15 wherein said means for disengaging said locking plunger from said corresponding plunger passage responsive to the cradle entering the park position further comprises:

a stop rod having a stop rod axis, said stop rod being aligned with a stop rod passage in said transfer base member, said stop rod passage being positioned such that said stop rod axis intersects the cradle;

means for translating said stop rod through said stop rod passage as the cradle approaches the park position; and means for withdrawing said locking plunger from said corresponding plunger passage responsive to said translation of said stop rod as the cradle approaches the park position.

17. The off-cradle tool base immobilization system of claim 16 wherein said stop rod is affixed to the cradle thereby providing said means for translating said stop rod as the cradle approaches the park position; and said means for withdrawing said locking plunger from said corresponding plunger passage responsive to said translation of said stop rod as the cradle approaches the park position further comprises:

a tie bar affixed to said locking plunger and positioned to engage said stop rod as the cradle approaches the park position.

18. The off-cradle tool base immobilization system of claim 16 wherein said stop rod is affixed to the cradle thereby providing said means for translating said stop rod as the cradle approaches the park position; and said means for withdrawing said locking plunger from said corresponding plunger passage responsive to said translation of said stop rod as the cradle approaches the park position further comprises:

a pivot arm connected to said locking plunger and pivoting about a locking plunger axis and connected to said transfer base member and pivoting about a transfer base member axis, said pivot arm being so positioned as to engage said stop rod when the cradle approaches the park position; and means for varying the separation between said locking plunger axis and said transfer base member axis.

19. The off-cradle tool base immobilization system of claim 16 wherein:

said stop rod has a cradle engaging end which serves as said means for translating said stop rod through said stop rod passage as the cradle approaches the park position; and said means for withdrawing said locking plunger from said corresponding plunger passage responsive to said translation of said stop rod as the cradle approaches the park position further comprises:

a tie bar affixed to said locking plunger and to said stop rod.

20. The off-cradle tool base immobilization system of claim 16 wherein:

said stop rod is pivotably attached to a pivot arm, said stop rod having a cradle engaging end which serves as said means for translating said stop rod through said stop rod passage as the cradle approaches the park position; and said means for withdrawing said locking plunger from said corresponding plunger passage responsive to said translation of said stop rod as the cradle approaches the park position further comprises:

connection of said pivot arm to said locking plunger at a locking plunger axis and to said transfer base member at a transfer base member axis; and means for varying the separation between said locking plunger axis and said transfer base member axis.

\* \* \* \* \*